(12) United States Patent
Kellar et al.

(10) Patent No.: US 8,600,601 B2
(45) Date of Patent: Dec. 3, 2013

(54) POSITIONING SYSTEM AND METHOD

(75) Inventors: William James Kellar, Dutton Park (AU); Damien Dusha, Dutton Park (AU); Stuart Gray, Dutton Park (AU); Peter James Roberts, Dutton Park (AU)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 13/130,035

(22) PCT Filed: Dec. 2, 2009

(86) PCT No.: PCT/AU2009/001576
§ 371 (c)(1), (2), (4) Date: Aug. 31, 2011

(87) PCT Pub. No.: WO2010/063073
PCT Pub. Date: Jun. 10, 2010

(65) Prior Publication Data
US 2011/0307138 A1    Dec. 15, 2011

(30) Foreign Application Priority Data
Dec. 5, 2008   (AU) .............................. 2008906306

(51) Int. Cl.
  *G01C 22/00*   (2006.01)
  *G05D 1/00*    (2006.01)
(52) U.S. Cl.
  USPC .............................................. 701/23; 701/24

(58) Field of Classification Search
  USPC ............ 701/23, 207, 200, 226, 213, 50, 214; 342/357.02, 357.03, 357.15, 358, 342/357.04; 172/5
  See application file for complete search history.

(56) References Cited

U.S. PATENT DOCUMENTS

| | | | | |
|---|---|---|---|---|
| 5,923,287 A * | 7/1999 | Lennen | ..................... | 342/357.73 |
| 6,229,479 B1 * | 5/2001 | Kozlov et al. | ............ | 342/357.34 |
| 6,810,324 B1 * | 10/2004 | Nadkarni | ..................... | 701/470 |
| 6,957,143 B1 * | 10/2005 | Nadkarni | ...................... | 701/470 |
| 7,302,362 B2 * | 11/2007 | Misra et al. | ................... | 702/182 |
| 7,463,980 B2 * | 12/2008 | Hoiness et al. | ............... | 701/484 |
| 7,496,477 B2 * | 2/2009 | Misra et al. | ..................... | 702/187 |
| 7,646,336 B2 * | 1/2010 | Tan et al. | ................. | 342/357.31 |
| 7,747,384 B1 * | 6/2010 | Nadkarni et al. | ............. | 701/469 |
| 8,149,897 B2 * | 4/2012 | Abraham | ..................... | 375/148 |
| 2003/0187560 A1 | 10/2003 | Keller et al. | | |
| 2008/0088506 A1 | 4/2008 | Fischer | | |
| 2011/0307138 A1* | 12/2011 | Kellar et al. | .................... | 701/23 |

* cited by examiner

*Primary Examiner* — Thomas Black
*Assistant Examiner* — Robert Payne
(74) *Attorney, Agent, or Firm* — Maschoff Brennan

(57) ABSTRACT

A positioning method that calculates a lower accuracy positioning solution and applies an offset to the lower accuracy positioning solution to form a final positioning solution if a higher accuracy positioning solution is unavailable. The offset represents a difference between the lower accuracy positioning solution and the higher accuracy positioning solution at a point in time when the higher accuracy positioning solution was last available.

15 Claims, 6 Drawing Sheets

POSITIONING SYSTEM AND METHOD

FIELD OF THE INVENTION

The present invention relates to a positioning system and method. In particular, the invention relates to a positioning method and system that utilizes two or more concurrent GNSS positioning calculation methodologies.

BACKGROUND TO THE INVENTION

Many applications use methods and systems for position determination, e.g. of a geodetic instrument, a vehicle or the like, which are based on global positioning systems, such as, for example, GPS, GLONASS or the European Galileo system. These Global Navigation Satellite Systems (GNSS) are based on the reception of satellite signals.

The requirements of vehicle guidance or navigation, e.g. in agricultural, mining, trucking or railroad applications, have subtle differences to those of surveying, including a much stronger requirement for continuously available positioning. However, the ability to provide continuously available positioning can be difficult.

In agricultural applications, GNSS's are used to guide a tractor, harvester or the like along a predetermined path. This guidance may take the form of mechanisms that directly control the vehicle to maintain the vehicle along the path (hereinafter auto-steering systems) or may take the form of a display to the vehicle operator to assist the operator in maintaining the vehicle along the predetermined path.

There are a number of GNSS positioning solutions with each solution utilising differing calculation methodologies. Each positioning solution has a different level of accuracy and reliability.

In vehicle guidance applications, and in particular in agricultural and mining auto-steering systems, it is desirable to have a highly accurate positioning solution. Real Time Kinematic (RTK) Carrier Phase Differential positioning is one such solution. RTK satellite navigation is a positioning calculation methodology based on the use of carrier phase measurements of the satellite signals from the GPS, GLONASS, Galileo or like systems where one or more station(s) provides real-time corrections to increase accuracy.

In practice, RTK systems use one or more base station receiver(s) and a mobile receiver on each vehicle whereby the base station broadcasts measurements of the phase of the carrier, and the mobile receiver uses the phase measurements received with those broadcast by the base station(s).

This allows the relative position of the vehicle to be calculated very accurately. However, the absolute position of the vehicle is still subject to the same absolute error as the base station.

Positioning error from lower accuracy position solutions, such as Relative Pseudorange Delta-Phase (RPDP), is typically much greater than the error from higher accuracy solutions, such as RTK, but lower accuracy solutions are often more reliable in terms of availability. Whilst the positioning errors of RPDP solutions are larger than that of RTK, they are highly auto-correlated and change relatively slowly over short periods of time.

When the higher accuracy positioning solution becomes unavailable, it is desirable to seamlessly transition to guidance using a lower accuracy positioning solution that has a greater reliability. However, as each solution has different errors, an immediate change over from one solution to the other will result in what is known as a position jump.

Clearly, a position jump in an auto-steering system will result in an abrupt course change as the positioning system will believe that the vehicle has suddenly moved position and the auto-steering system will consequently attempt to move back onto the predetermined path.

SUMMARY OF THE INVENTION

In one form, although it need not be the broadest form, the invention resides in a positioning method including the steps of:

calculating a lower accuracy positioning solution; and applying an offset to the lower accuracy positioning solution to form a final positioning solution if a higher accuracy positioning solution is unavailable, the offset representative of a difference between the lower accuracy positioning solution and the higher accuracy positioning solution at a point in time when the higher accuracy positioning solution was last available.

In a further form, the invention resides in a positioning method including the steps of:

calculating a higher accuracy positioning solution;

calculating a lower accuracy positioning solution;

updating an offset, the offset being representative of a difference between the lower accuracy positioning solution and the higher accuracy positioning solution;

communicating a final positioning solution in the form of the higher accuracy positioning solution.

In yet a further form, the invention resides in a positioning system for a vehicle, the positioning system comprising:

a higher accuracy positioning module configured to calculate a higher accuracy positioning solution for the vehicle;

a lower accuracy positioning module configured to calculate a lower accuracy positioning solution for the vehicle; and a correction module in communication with the higher accuracy positioning module and the lower accuracy positioning module, the correction module configured to provide a final positioning solution to guide the vehicle along a predetermined path;

wherein the correction module is further configured to maintain an offset representative of the difference between the higher accuracy positioning solution and the lower accuracy positioning solution whilst the higher accuracy positioning solution is reliable.

Further features of the invention will become apparent from the following detailed description.

BRIEF DESCRIPTION OF THE DRAWINGS

By way of example only, preferred embodiments of the invention will be described more fully hereinafter with reference to the accompanying drawings, wherein.

DETAILED DESCRIPTION OF THE INVENTION

The invention will be described with reference to a GPS GNSS for guidance of an agricultural vehicle. However, a skilled person will appreciate that the system is applicable utilizing any known GNSS for any known guidance application.

Figure 1:
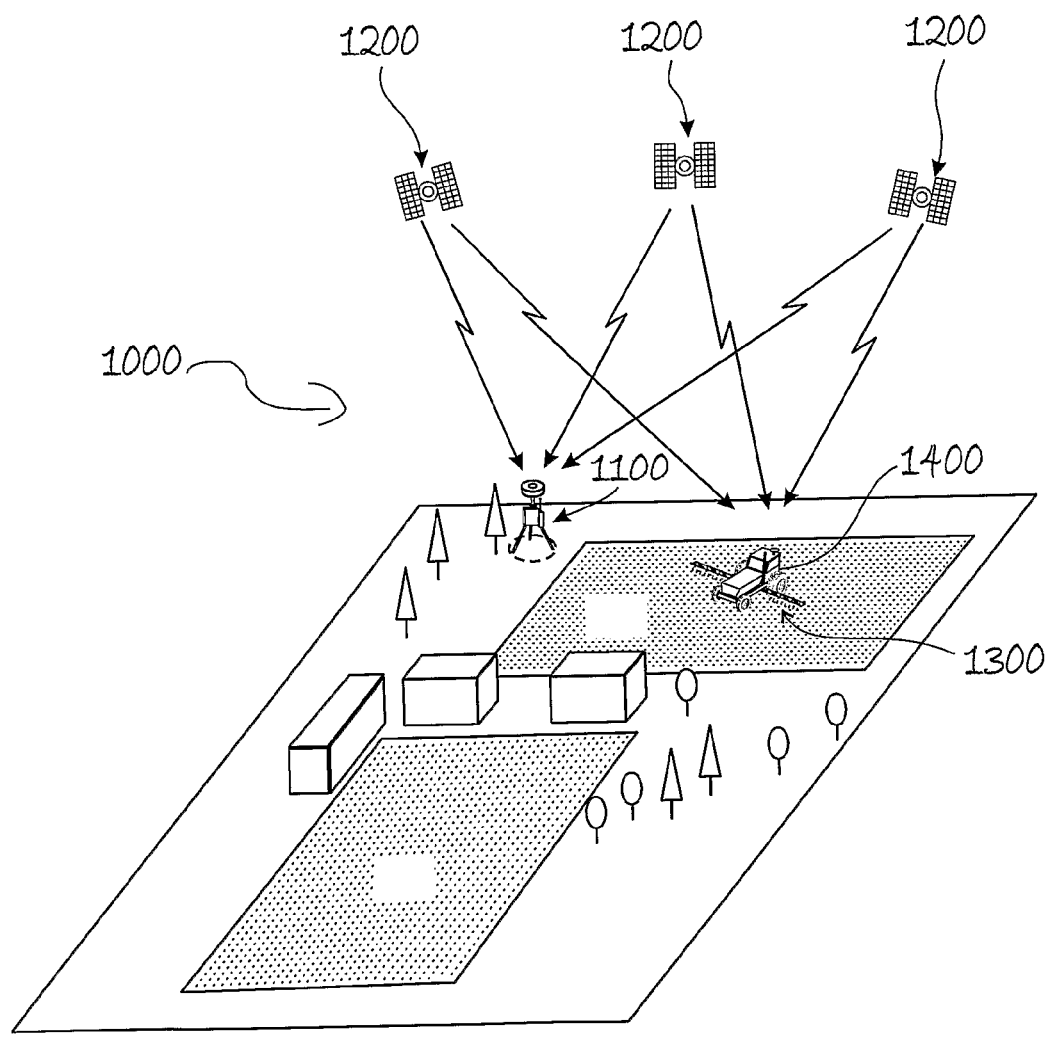
FIG. 1 shows a schematic view of a positioning system according to an embodiment of the invention.
Figure 2:
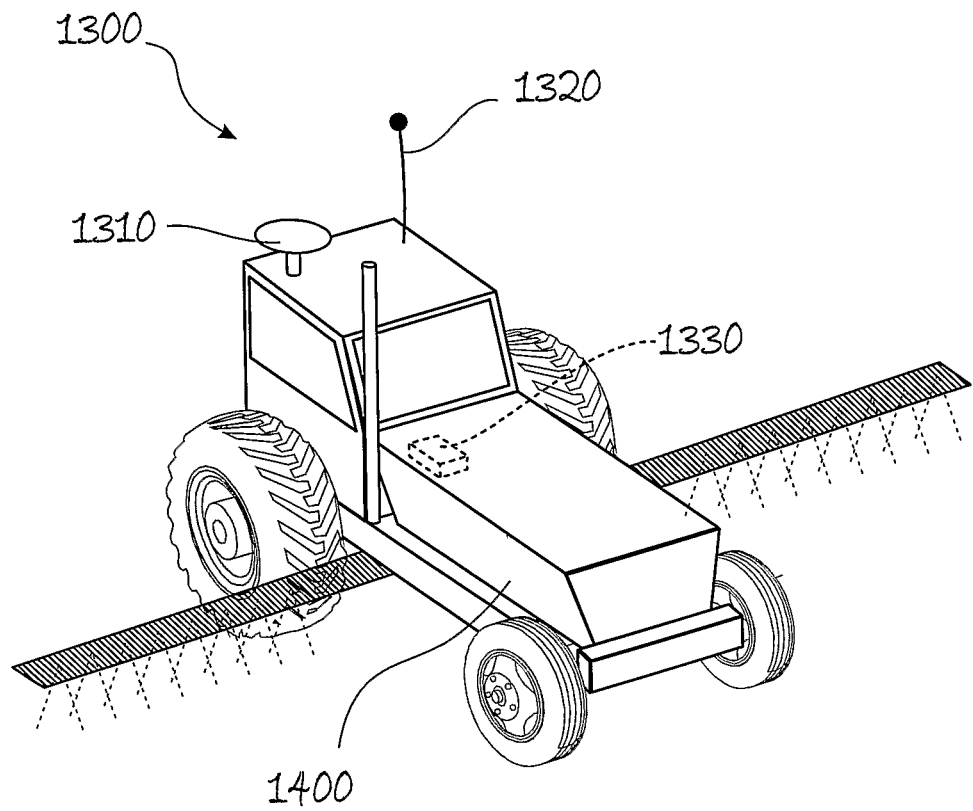
FIG. 2 shows a schematic view of a vehicle forming part of the positioning system shown in FIG. 1.

FIG. 1 shows a schematic view of a positioning system 1000 according to an embodiment of the invention whereby a vehicle 1400 is using GPS to navigate along a predetermined path and FIG. 2 shows a schematic of vehicle 1400.

Positioning system 1000 has a series of satellites 1200 forming the GPS constellation and vehicle 1400 is fitted with a positioning apparatus 1300 in the form of a GPS antenna 1310 configured to receive ranging signals from GPS satellites 1200, and a GPS receiver 1330 configured to receive the ranging signals received at GPS antenna 1310 and calculate a positioning solution based on the same. The ranging signals may typically include pseudorange and carrier phase measurements.

Furthermore, in the embodiment, a base station 1100 forms part of the positioning system 1000. Base station 1100 is configured to receive ranging signals from satellites 1200 forming the GPS constellation and transmit RTK correction data in the form of measured carrier phase data to radio antenna 1320 of positioning apparatus 1300.

Figure 3:
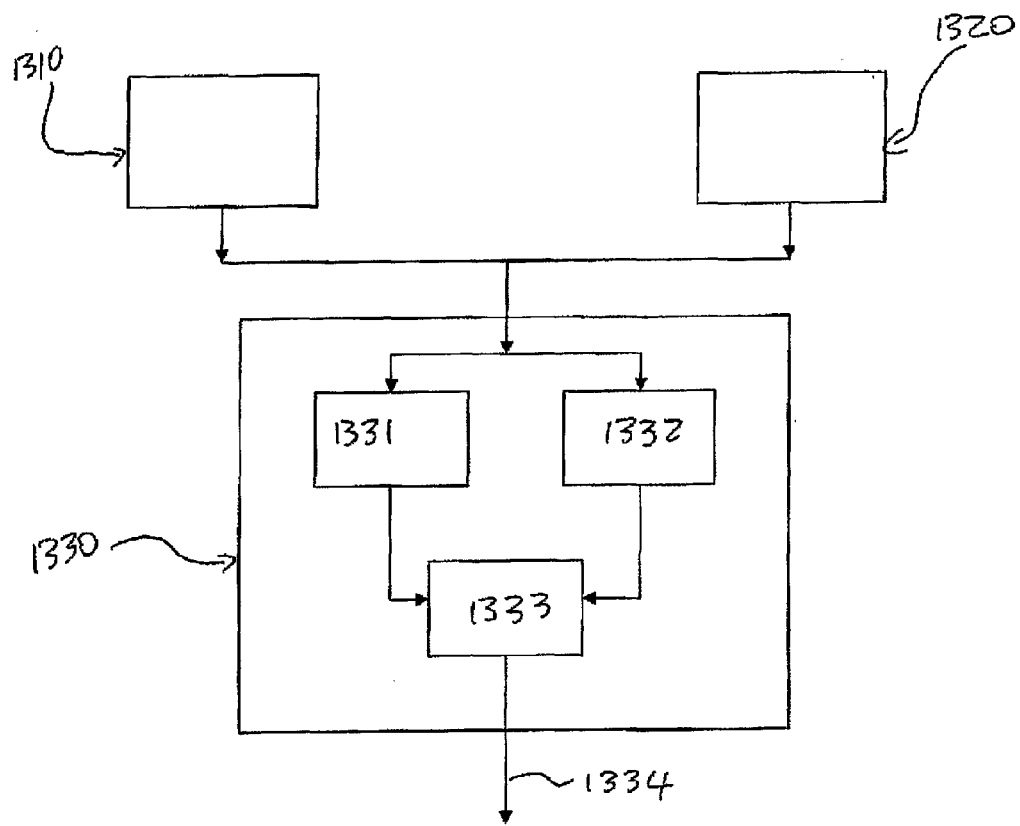
FIG. 3 show a functional schematic of a GPS receiver forming part of the positioning system shown in FIG. 1.

FIG. 3 shows a functional schematic of GPS receiver 1330 of positioning apparatus 1300. GPS receiver 1330 has a higher accuracy positioning module 1331, a lower accuracy positioning module 1332 and a correction module 1333.

In a preferred form, the higher accuracy positioning module 1331, the lower accuracy positioning module 1332 and the correction module 1333 are software modules executing in a computing device of GPS receiver 1330. In this form, GPS receiver 1330 is in the form of any known GPS receiver that has had proprietary software, in the form of higher accuracy positioning module 1331, the lower accuracy positioning module 1332 and the correction module 1333, installed thereon.

Higher accuracy positioning module 1331 receives ranging data from GPS antenna 1310 and correction data from radio antenna 1320. In the embodiment, the higher accuracy positioning module 1331 calculates a positioning solution for vehicle 1400 using RTK.

Lower accuracy positioning module 1332 receives ranging data from GPS antenna 1310 and optionally correction data from radio antenna 1320 or via the GPS antenna from a Space Based Augmentation Service (SBAS). In the embodiment, lower accuracy positioning module 1332 calculates a positioning solution for vehicle 1400 using RPDP.

Correction module 1333 is in communication with higher accuracy positioning module 1331 and lower accuracy positioning module 1332 and receives the positioning solution calculated by each module. Correction module 1333 provides a final positioning solution 1334. This final positioning solution 1334 may be communicated directly to an auto-steer system (not shown) in order to directly control guidance of the vehicle 1400 along a predetermined path. Alternatively, final positioning solution 1334 may be communicated to a display to instruct an operator of vehicle 1400 to maintain vehicle 1400 on a predetermined path.

The function of correction module 1333 will be described in greater detail below with reference to FIG. 4.

It will be appreciated that, whilst the embodiment has been described with reference to higher accuracy positioning module 1331 conducting RTK positioning calculations and lower accuracy positioning module 1332 conducting RPDP positioning calculations, the invention is not so limited to these particular methodologies. The invention extends to any positioning calculation methodologies whereby higher accuracy positioning module 1331 implements a positioning calculation methodology having a higher accuracy than the positioning calculation methodology implemented on lower accuracy positioning module 1332.

Furthermore, the invention extends to GNSS positioning methodologies that do not require correction data from base station 1400.

Figure 4:
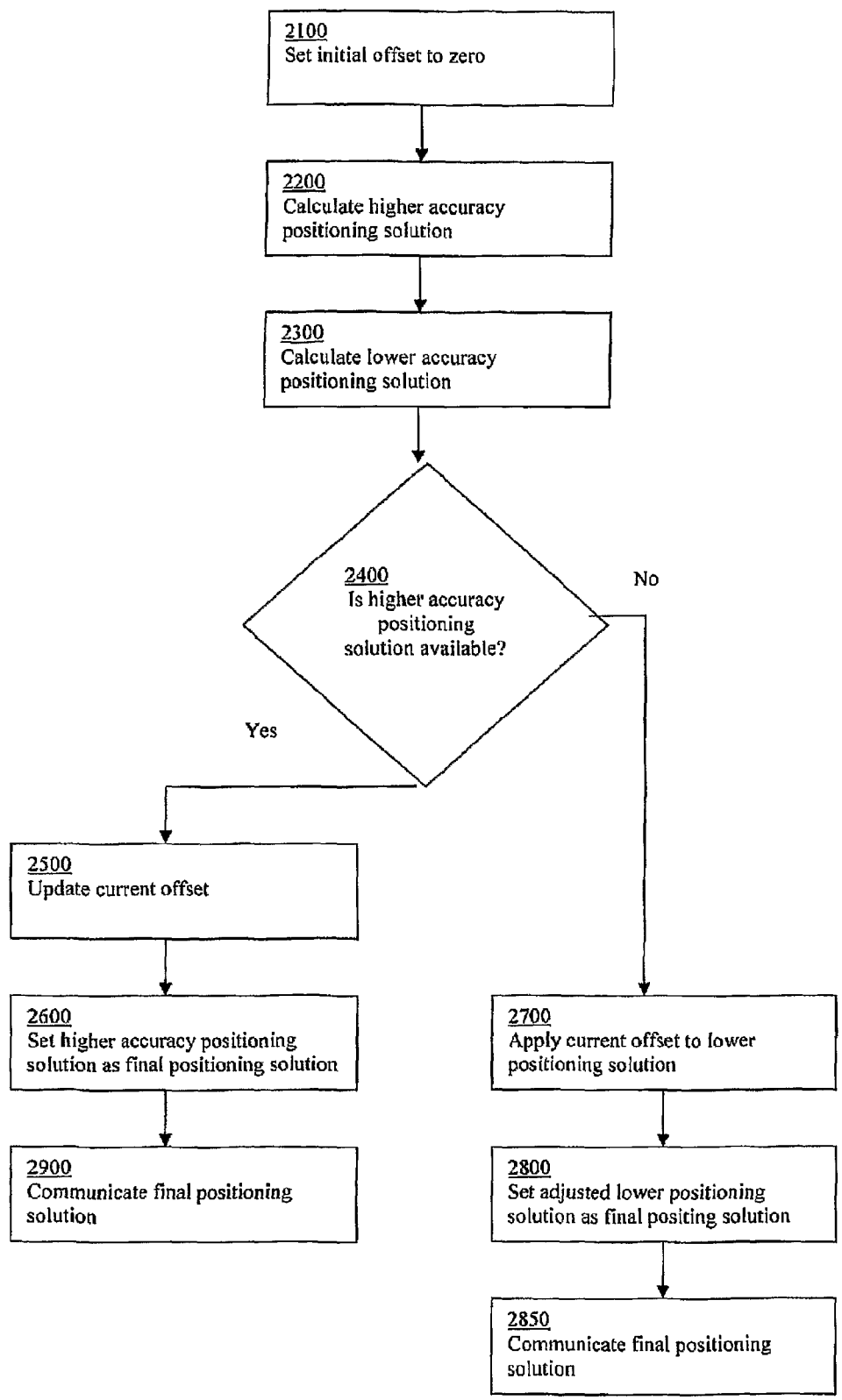
FIG. 4 shows a positioning method according to an embodiment of the invention.

FIG. 4 shows a positioning method 2000 according to an embodiment of the invention. The positioning system 1000 and positioning method 2000 of the invention overcomes the problems of position jump, as described above, when the higher accuracy positioning solution becomes unavailable or unreliable by continuously maintaining an offset between the positioning solution calculated by higher and lower positioning solutions and applying that offset to the lower positioning solution when the higher accuracy positioning solution becomes unavailable or unreliable.

Correction module 1333 of GPS receiver 1330 maintains an offset which represents the difference in position between the positioning solution calculated by the higher accuracy positioning module 1331 and lower accuracy positioning module 1332.

When GPS receiver 1330 is powered up, correction module 1333 sets the offset to zero (step 2100).

Higher accuracy positioning module 1331 then calculates the position of the vehicle to provide a higher accuracy positioning solution (step 2200). As discussed, in the embodiment this is carried out using RTK.

Similarly, lower accuracy positioning module 1332 then calculates the position of the vehicle to provide a lower accuracy positioning solution (step 2200). As discussed, in the embodiment this is carried out using RPDP.

The correction module 1333 then determines whether the higher accuracy positioning solution is available or reliable (step 2400). In the embodiment, this may occur, for example, when higher accuracy positioning module 1332 is unable to compute a RTK solution and hence the correction module 1333 does not receive a position solution from higher accuracy positioning module 1332. In this case, there is no higher accuracy position solution available and the method continues on to step 2700 as discussed further below.

In the event that there is a higher accuracy positioning solution available, correction module 1333 then receives both the lower accuracy positioning solution and the higher accuracy positioning solution and updates the offset based on the difference between the two solutions (step 2500). That is, the offset, when applied to the lower accuracy positioning solution, will transform the lower accuracy positioning solution to an adjusted lower accuracy positioning solution that is identical to the higher accuracy positioning solution at that specific moment in time.

The correction module 1333 then sets the higher accuracy positioning solution as the final positioning solution 1334 (step 2600) and communicates the final positioning solution to be used as discussed above (step 2900).

The GPS receiver 1330 then conducts positioning calculations for the next epoch in time as discussed above from step 2200.

In the event that the correction module 1333 determines that there is no higher accuracy positioning solution available at step 2400, the correction module 1333 then applies the current offset to the lower positioning solution to create an adjusted positioning solution (step 2700) and the adjusted positioning solution is set as the final positioning solution 1334 (step 2800). The correction module 1333 then communicates the final positioning solution (step 2850) to be used as discussed previously.

As the current offset is calculated based on the difference between the higher accuracy positioning solution and the lower accuracy positioning solution at the last epoch when both solutions are available, the adjusted positioning solution will, at the epoch immediately after loss or unreliability of the higher accuracy positioning solution, not be subject to a position jump as is known in the art.

In this way, the GPS receiver 1330 may continue to guide the vehicle along a predetermined path using a lower accuracy positioning solution without sudden position jumps due to a sudden change in positioning solutions.

As lower positioning solutions demonstrate a higher drift in terms of positioning errors over time, it is desirable to utilize the higher positioning solution as the final positioning solution 1334 when the higher positioning solution becomes available again.

Figure 5:
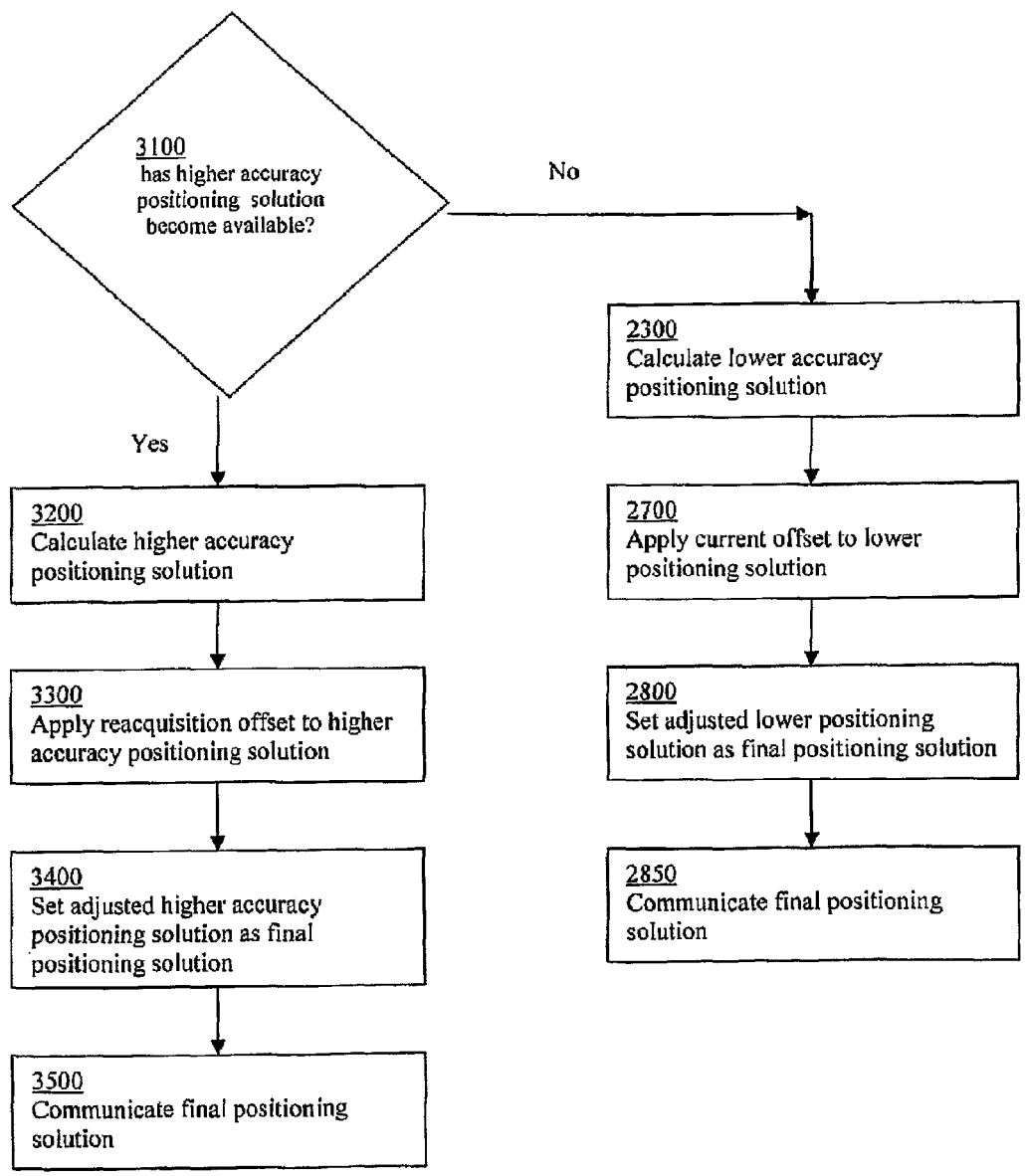
FIG. 5 shows a method of positioning using a reacquired higher accuracy positioning solution as a final positioning solution forming part of the method shown in FIG. 4.

FIG. 5 shows a method 3000 of positioning using a reacquired higher accuracy positioning solution as the final positioning solution 1334.

The correction module 1333 continuously determines whether the higher accuracy positioning solution is again available (step 3100). In the event that it is not, steps 2300, 2700, 2800 and 2850 are completed as discussed above.

In the event that the higher accuracy positioning solution has again become available or reliable, the higher accuracy positioning module 1331 calculates the position (step 3200) as discussed previously and communicates same to the correction module 1333.

The correction module 1333 then applies a reacquisition offset to the calculated higher accuracy positioning solution to from an adjusted higher accuracy positioning solution (step 3300).

The reacquisition offset is the difference between the final positioning solution at the current epoch and the calculated higher accuracy positioning solution. As discussed, this offset is the applied to the higher accuracy positioning solution to form the adjusted higher accuracy positioning solution.

In this way, there are no position jumps when the GPS receiver 1330 begins position calculation using the higher accuracy positioning solution which, in the embodiment, is RTK.

The correction module 1333 then sets the adjusted higher accuracy positioning solution as the final positioning solution 1334 (step 3400) and this final positioning solution is then communicated for use (Step 3500) as previously discussed.

Importantly, the reacquisition offset is then applied to all further positioning solution calculations thereafter. Furthermore, the current offset (that is, the difference between the actual higher accuracy positioning solution and the lower accuracy positioning solution calculated at an epoch immediately prior to the higher accuracy positioning solution becoming unavailable) is applied to all lower accuracy position solution calculations.

Whilst the lower accuracy position solution may drift whilst the higher accuracy position solution is unavailable due to its lower accuracy, the reacquisition of the higher accuracy position solution will minimize that drift and further ensure that the relative error is minimized.

Alternatively, upon reacquisition of the higher accuracy positioning solution, the correction module 1333 may set a path that causes the vehicle to gradually steer back to the higher accuracy position solution. This mode is particular advantageous when the difference between the actual lower accuracy positioning solution and the actual higher accuracy positioning solution is below a predetermined offset.

Figure 6:
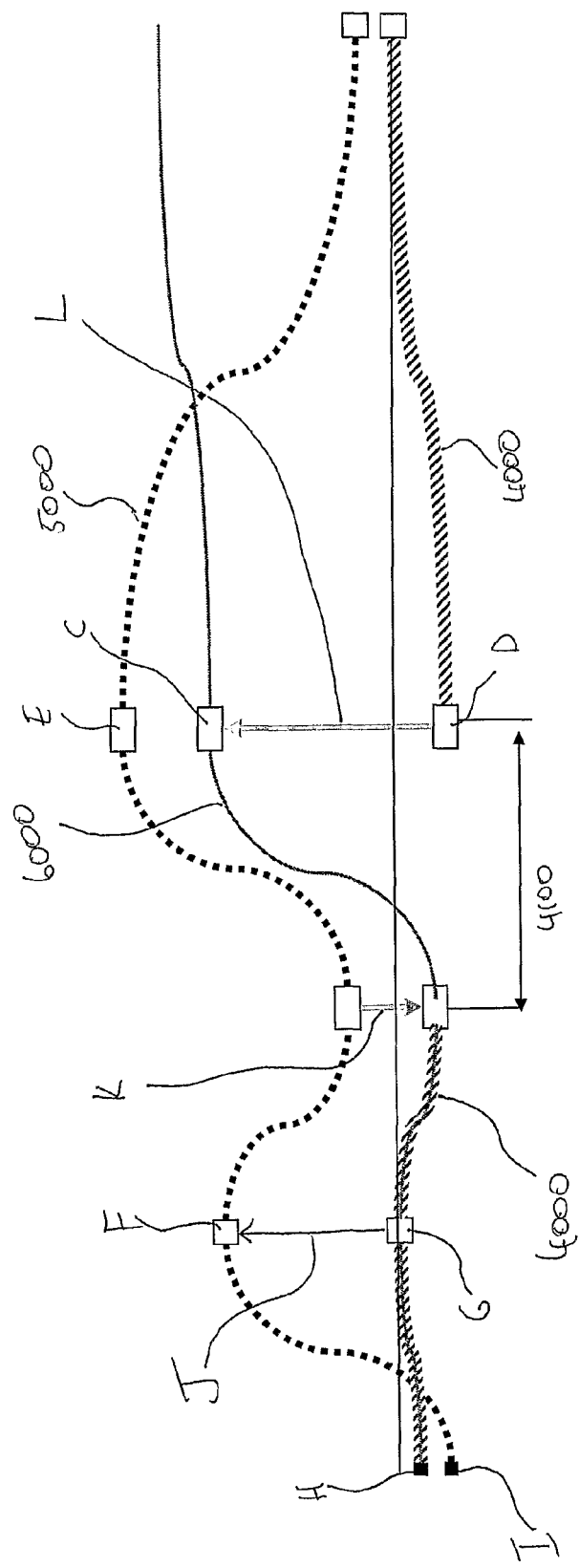
FIG. 6 shows an example of an application of the positioning method and system of the invention.

FIG. 6 shows an example of an application of the positioning method and system of the invention.

Line 5000 represents the position calculated by the lower accuracy positioning module 1332 which, in the embodiment, is a RPDP solution. Line 4000 represents the position calculated by the higher accuracy positioning module 1331 which, in the embodiment, is a RTK solution. The portion 4100 of line 4000 represents a period when the higher accuracy positioning solution is unavailable or unreliable.

Line 6000 represents the final positioning solution 1334 which, in the embodiment, is the position that is communicated to the auto-steer application and/or presented to an operator of vehicle 1400 to represent the position of the vehicle 1400.

Point H and point I represent a start up point for GPS receiver 1330. Point H represents the higher accuracy positioning solution calculated by the higher accuracy positioning module 1331 and point I represents the lower accuracy positioning solution calculated by the lower accuracy positioning module 1332.

As the higher accuracy positioning solution is available at this point in time, guidance of the vehicle 1400 is conducted on the basis of that solution.

Point G represents the higher accuracy positioning solution calculated by the higher accuracy positioning module 1331 at a subsequent epoch and point F represents the lower accuracy positioning solution calculated by the lower accuracy positioning module 1332 at the same time.

As the higher accuracy positioning solution is available at this point in time, guidance of the vehicle 1400 is conducted on the basis of that solution.

Distance J represents the current offset between the two solutions and correction module 1333 stores this offset.

Similarly, Point B represents the higher accuracy positioning solution calculated by the higher accuracy positioning module 1331 at a subsequent epoch and point A represents the lower accuracy positioning solution calculated by the lower accuracy positioning module 1332 at the same time.

Distance k represents the current offset between the two solutions and correction module 1333 stores this offset.

Immediately after point B, correction module 1333 determines that the higher accuracy positioning solution has become unavailable or unreliable and steps 2700, 2800 and 2850 are executed by correction module 1333. That is, the current offset value K is applied to the lower accuracy positioning solution calculated immediately after point A to form the adjusted lower accuracy positioning solution which is set as the final positioning solution 1334 which is used for guidance.

As shown, the final positioning solution 1334 between points B and C tracks the calculated lower accuracy positioning solution with an offset of K.

Furthermore, as shown, there are no position jumps in this final positioning solution as a result of a different positioning methodology being implemented and hence resulting in a seamless transition.

At points C, D, and E, the correction module 1333 determines that the higher accuracy positioning solution has again become available or reliable and, as such, steps 3200, 3300, 3400 and 3500 are carried out.

That is, the reacquisition offset is applied to the higher accuracy positioning solution calculated at point D to form an adjusted higher accuracy positioning solution and this solution is set as the final positioning solution 1334, as represented by point C. Thereafter, the final positioning solution 1334 tracks the actual higher accuracy positioning solution with the reacquisition offset L applied.

The positioning method and system of the invention provides for more reliable guidance of vehicles and the like whereby two different positioning methodologies may be implemented such that a seamless transition between those positioning methodologies is facilitated without the disadvantage of position jump.

Throughout the specification the aim has been to describe the present invention without limiting the invention to any one embodiment or specific collection of features. Persons skilled in the relevant art may realize variations from the specific embodiments that will nonetheless fall within the scope of the present invention.

The invention claimed is:

1. A positioning method including the steps of:
   calculating a lower accuracy positioning solution;
   applying an offset to the lower accuracy positioning solution to form a final positioning solution if a higher accuracy positioning solution is unavailable, the offset representative of a difference between the lower accuracy positioning solution and the higher accuracy positioning solution at a point in time when the higher accuracy positioning solution was last available;
   continuously determining whether the higher accuracy positioning solution has again become available; and
   in the event that the higher accuracy positioning solution has become available:
   calculating the higher accuracy positioning solution;
   applying a reacquisition offset to the higher accuracy positioning solution to form an adjusted higher accuracy positioning solution; and
   setting the adjusted higher accuracy positioning solution as a new final positioning solution.

2. The positioning method of claim 1, wherein the reacquisition offset is representative of a difference between the final positioning solution and the higher accuracy positioning solution.

3. The positioning method of claim 1, wherein the new final positioning solution is communicated to control guidance of a vehicle along a predetermined path.

4. The positioning method of claim 1, wherein the final positioning solution is communicated to control guidance of a vehicle along a predetermined path.

5. The positioning method of claim 1, wherein the higher accuracy positioning solution is a Real Time Kinematic (RTK) positioning solution.

6. The positioning method of claim 1, wherein the lower accuracy positioning solution is a Relative Pseudorange Delta-Phase (RPDP) positioning solution.

7. The positioning method of claim 1, wherein the offset is applied to the lower accuracy positioning solution to form the final positioning system if the higher accuracy positioning solution is unreliable.

8. A positioning method including the steps of:
   calculating a higher accuracy positioning solution;
   calculating a lower accuracy positioning solution;
   updating an offset, the offset being representative of a difference between the lower accuracy positioning solution and the higher accuracy positioning solution;
   determining whether the higher accuracy positioning solution is reliable; and
   communicating a final positioning solution in the form of:
   applying the offset to the lower accuracy positioning solution in the event that the higher accuracy positioning solution is determined to be unreliable; and
   applying a reacquisition offset to the higher accuracy positioning solution to form an adjusted higher accuracy positioning solution if the higher accuracy positioning solution was determined to be unreliable but has again been determined to be reliable.

9. The positioning method of claim 8, wherein the higher accuracy positioning solution is a Real Time Kinematic (RTK) positioning solution.

10. The positioning method of claim 8, wherein the lower accuracy positioning solution is a Relative Pseudorange Delta-Phase (RPDP) positioning solution.

11. A positioning system for a vehicle, the positioning system comprising:
    a higher accuracy positioning module configured to calculate a higher accuracy positioning solution for the vehicle;
    a lower accuracy positioning module configured to calculate a lower accuracy positioning solution for the vehicle; and
    a correction module in communication with the higher accuracy positioning module and the lower accuracy positioning module, the correction module configured to provide a final positioning solution to guide the vehicle along a predetermined path;
    wherein the correction module is further configured to:
    maintain an offset representative of the difference between the higher accuracy positioning solution and the lower accuracy positioning solution whilst the higher accuracy positioning solution is reliable
    apply the offset to the lower accuracy positioning solution to form the final positioning solution in the event that that higher accuracy positioning solution becomes unreliable; and
    applying a reacquisition offset to the higher accuracy positioning solution to form an adjusted higher accuracy positioning solution if the higher accuracy positioning solution was determined to be unreliable but has again been determined to be reliable.

12. The positioning method of claim 8, wherein the reacquisition offset is representative of a difference between the final positioning solution and the higher accuracy positioning solution.

13. The positioning system of claim 11, wherein the reacquisition offset is representative of a difference between the final positioning solution and the higher accuracy positioning solution.

14. The positioning system of claim 11, wherein the higher accuracy positioning solution is a Real Time Kinematic (RTK) positioning solution.

15. The positioning system of claim 11, wherein the lower accuracy positioning solution is a Relative Pseudorange Delta-Phase (RPDP) positioning solution.

* * * * *